United States Patent
Simionescu et al.

(10) Patent No.: US 10,929,056 B2
(45) Date of Patent: Feb. 23, 2021

(54) INTERRUPTION OF PROGRAM OPERATIONS AT A MEMORY SUB-SYSTEM

(71) Applicant: Micron Technology, Inc., Boise, ID (US)

(72) Inventors: Horia C. Simionescu, Foster, CA (US); Rohitkumar Makhija, Milpitas, CA (US); Peng-Cheng Chen, Los Gatos, CA (US); Jung Sheng Hoei, Newark, CA (US)

(73) Assignee: Micron Technology, Inc., Boise, ID (US)

( * ) Notice: Subject to any disclaimer, the term of this patent is extended or adjusted under 35 U.S.C. 154(b) by 95 days.

(21) Appl. No.: 16/235,474

(22) Filed: Dec. 28, 2018

(65) Prior Publication Data

US 2020/0210098 A1 Jul. 2, 2020

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC combination set(s) only.
See application file for complete search history.

(56) References Cited

U.S. PATENT DOCUMENTS

| | | |
|---|---|---|
| 2003/0193856 A1 | 10/2003 | Suzuki |
| 2011/0026318 A1 | 2/2011 | Franceschini et al. |
| 2012/0124317 A1 | 5/2012 | Mirichigni et al. |
| 2014/0075241 A1* | 3/2014 | Oh .................. G06F 11/141 714/15 |

FOREIGN PATENT DOCUMENTS

| | | |
|---|---|---|
| JP | 2002229744 A | 8/2002 |
| WO | 2010143209 A1 | 12/2010 |

OTHER PUBLICATIONS

PCT International Search Report and Written Opinion for International Application No. PCT/US2019/068796 dated Apr. 27, 2020, 10 pages.

* cited by examiner

*Primary Examiner* — Yong J Choe
(74) *Attorney, Agent, or Firm* — Lowenstein Sandler LLP (57) ABSTRACT

A read operation can be received while one or more program operations are being performed at a memory sub-system. In response to receiving the read operation, the one or more program operations being performed at the memory sub-system can be interrupted. Context data associated with the one or more interrupted program operations can be determined and the context data can be provided to a firmware associated with the memory sub-system. A control sequence can be received from the firmware based on the context data. The read operation can be performed and the one or more interrupted program operations can be resumed based on the control sequence from the firmware.

19 Claims, 6 Drawing Sheets

INTERRUPTION OF PROGRAM OPERATIONS AT A MEMORY SUB-SYSTEM

TECHNICAL FIELD

The present disclosure generally relates to a memory sub-system, and more specifically, relates to the interruption of program operations at a memory sub-system.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to the interruption of program operations at a memory sub-system. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. The memory sub-system can be a hybrid memory/storage sub-system. In general, a host system can utilize a memory sub-system that includes one or more memory components. The host system can provide data to be stored at the memory sub-system and can request data to be retrieved from the memory sub-system.

A conventional memory sub-system can perform various operations with respect to one or more memory components included in the memory sub-system. For example, read operations, program (i.e., write) operations, and erase operations can be performed at one or more memory components. In a conventional memory sub-system, the various operations can be performed in a sequence as each corresponding operation is received. The performance of a program operation at a memory component by the conventional memory sub-system can utilize a substantially longer amount of time to complete than the performance of a read operation at the memory component. Thus, if a read operation for a memory component is received while the conventional memory sub-system is performing the program operation at the memory component, then the read operation can be delayed until the program operation has completed. Such a delay in the performance of the read operation can result in additional read latency for the conventional memory sub-system.

Aspects of the present disclosure address the above and other deficiencies by interrupting program operations at a memory sub-system. A controller of the memory sub-system can include a hardware component and a firmware component. The hardware component of the controller of the memory sub-system can determine if a pausing or interruption of program operations should occur when a subsequent read operation is received. Furthermore, the hardware component can provide an indication to the firmware component when the program operations have been interrupted as a result of the subsequent read operation. As described in further detail below, the firmware component can receive context data associated with the program operations at the hardware component and can determine a sequence of operations based on the context data. The sequence of operations can be provided to and performed by the hardware component in order to perform the read operation and to resume the interrupted program operations. For example, the sequence of operations can specify a series of operations that are to be performed by the hardware component of the controller in order to safely perform the read operation and resume the paused or interrupted program operations without causing data integrity issues for the data of the program operations that were interrupted.

Advantages of the present disclosure include, but are not limited to, an improved performance of the memory sub-system as the read operations can be performed in less time. For example, since a read operation can be performed without waiting for the completion of a program operation, the read latency of the memory sub-system can be decreased. The decreasing of the read latency can result in the memory sub-system being capable of satisfying Quality of Service (QoS) requirements that specify various operating requirements when performing the read operations at the memory sub-system. Furthermore, more complex memory components can be utilized in the memory sub-system. The more complex memory components can have a larger capacity to store data and the amount of time to complete program operations on such memory components can also be longer as more data is to be written as part of a single program operation. The interruption of such program operations can thus allow for the read operations to be performed with a reduced latency despite the increased time needed to complete program operations.

Additionally, since the firmware component of the controller can determine the sequence of operations to be performed by the hardware component of the controller, the changing of the types of memory components used by the memory sub-system can require the updating of the firmware component as opposed to a modification of the hardware component of the controller. For example, the sequence of operations that are determined by the firmware component can be different based on the types, capacity, and various other characteristics of the memory components that are used in the memory sub-system. Thus, the hardware component of the controller does not need to be redesigned when different or new memory components are utilized by the memory sub-system as the firmware can be updated to determine the modified sequence of operations that can be appropriate for the new memory components. Thus, the present disclosure can include a controller with a hardware component and a flexible firmware component that can provide the interruption of program operations for different configurations of memory components.

Figure 1:
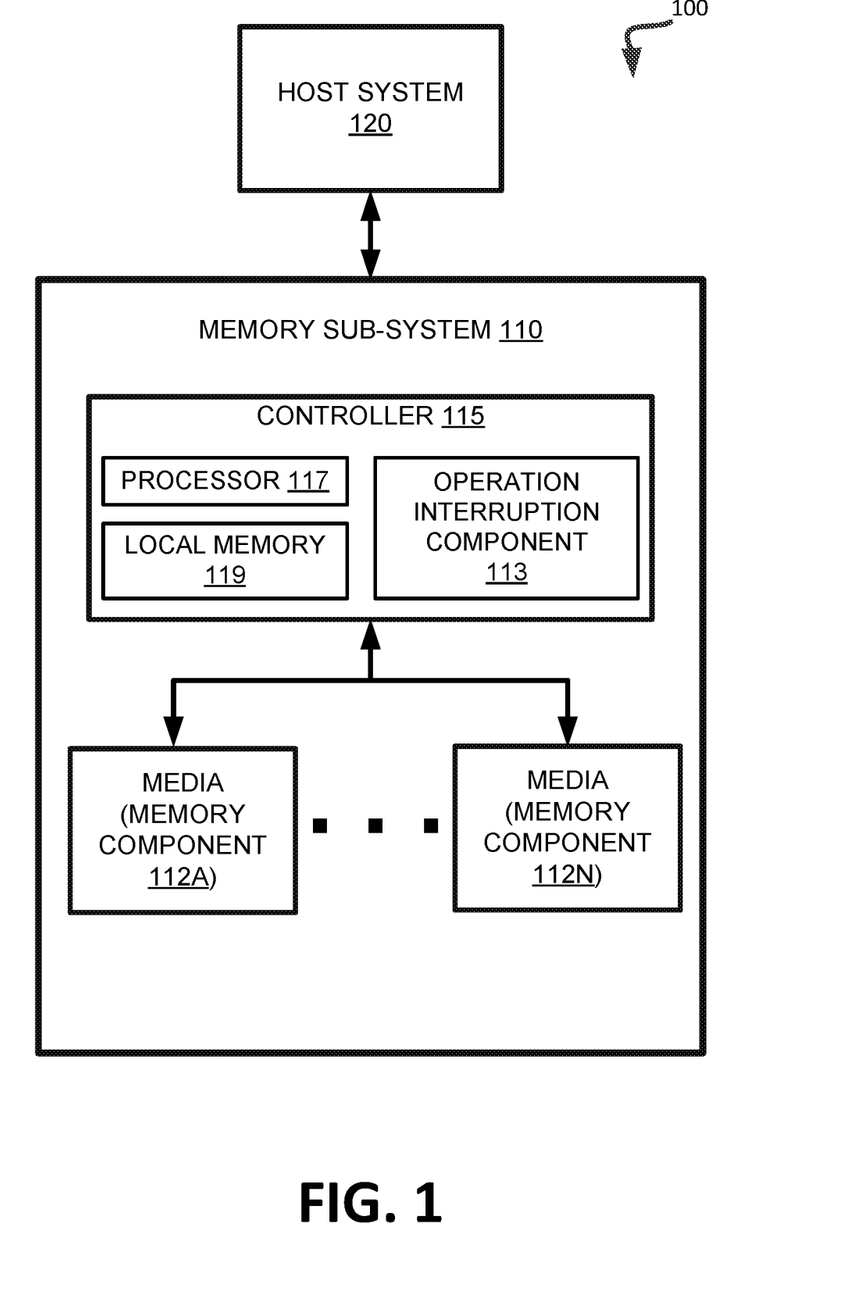
FIG. 1 illustrates an example computing environment that includes a memory sub-system in accordance with some embodiments of the present disclosure.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes an operation interruption component 113 that can be used to interrupt or pause one or more program operations being performed at the memory components 112A to 112N. In some embodiments, the controller 115 includes at least a portion of the operation interruption component 113. For example, the controller 115 can include a processor 117 (processing device) configured to execute instructions stored in local memory 119 for performing the operations described herein. In some embodiments, the operation interruption component 113 is part of the host system 120, an application, or an operating system.

The operation interruption component 113 can receive a read operation while one or more program operations are being performed by a hardware component of a controller (e.g., a hardware component of the controller 115). The hardware component can determine to pause or interrupt the one or more program operations and can provide a request for a sequence of operations to be performed in order to complete the read operation and resume the paused or interrupted program operations. In response to receiving the sequence of operations, the read operation can be performed and the paused or interrupted program operations can be resumed. Further details with regards to the operations of the operation interruption component 113 are described below.

Figure 2:
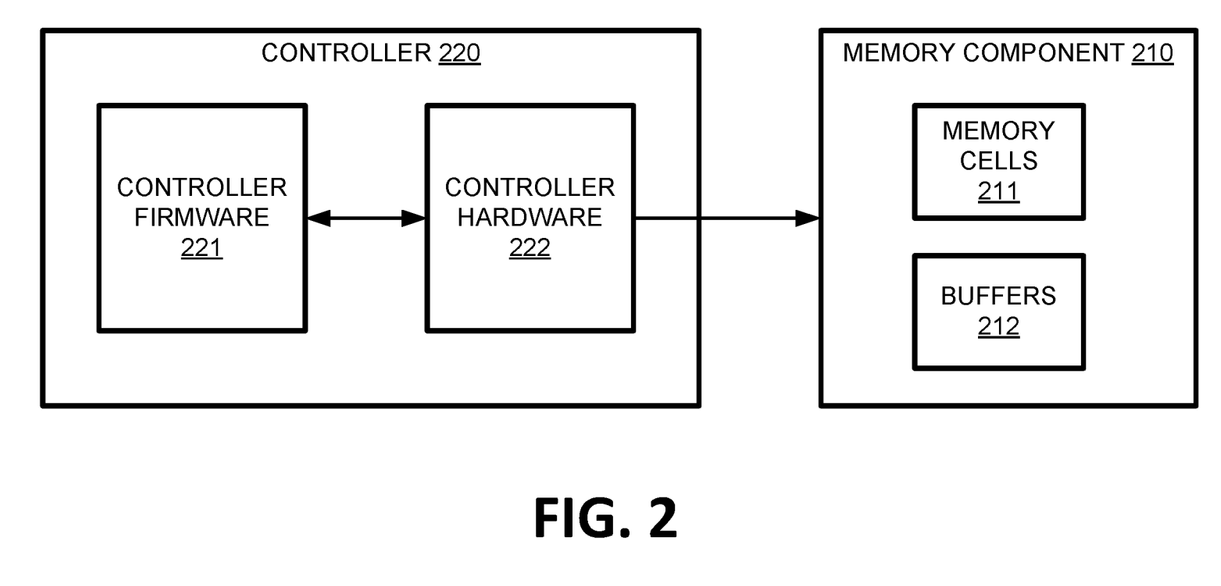
FIG. 2 illustrates the interaction between a firmware component of a controller and a hardware component of the controller when interrupting program operations for a memory component in accordance with some embodiments of the present disclosure.

FIG. 2 illustrates the interaction between a firmware component of a controller and a hardware component of the controller when interrupting program operations for a memory component in accordance with some embodiments of the present disclosure. The controller 220 can correspond to the controller 115 of FIG. 1.

As shown in FIG. 2, the controller 220 can include a controller firmware component 221 and a controller hardware component 222. The controller hardware component 222 can be circuitry of the controller 220 that is used to transmit and receive data to and from memory components of the memory sub-system. The controller firmware component 221 can be the firmware of the controller 220 that provides some control of the hardware of the controller 220. The controller 220 can receive read operations, write operations, and erase operations to be performed at memory components. The memory component 210 can be one memory component of multiple memory components that are coupled with the controller 220.

The memory component 210 can include memory cells 211 that are used to store data from a host system and buffers 212 that are used to provide a temporary storage for data to be written to the memory cells 211 as part of a program operation or for data that is retrieved from the memory cells 211 as part of a read operation. In some embodiments, the memory component 210 can move or copy data between the buffers 212. For example, data for a first program operation can be stored at a first buffer while the first program operation is being performed to write data at the memory cells 211. Similarly, data for a second program operation can be stored at a second buffer. A third buffer can be used to store data for a program operation when a read operation is to be performed. As an example, when a read operation is to be performed and the first and second program operations are to be paused or interrupted, the data for the first program operation at the first buffer can be copied to the third buffer. The read operation can then be performed and the corresponding data can be retrieved from the memory cells 211 and placed at the first buffer of the buffers 212. The retrieved data can then be returned to the controller 220 from the first buffer and then the data for the first program operation can be returned from the third buffer to the first buffer and the first program operation can resume after the read operation has completed.

The operations to move data between the different buffers, the determination of the data of a particular program operation that should be moved, etc. can be specified by a sequence of operations that are determined by the controller firmware component 221. For example, the controller hardware component 222 can pause or interrupt the performance of program operations when a read operation is received while the program operations are being performed. The controller hardware component 222 can notify the controller firmware component 221 that program operations have been paused or interrupted in response to receiving the read operation. In some embodiments, the controller hardware component 222 can further provide context data of the program operations that were received by the controller hardware component 222. As described in further detail below, the context data can specify which program operations that have been received by the controller hardware component 222 have been performed, which program operations have not been performed, which program operations were being performed when the corresponding program operations were interrupted, a state of each program operation with respect to the memory component 210, and a state of the memory component 210, etc.

The controller firmware component 221 can receive the context data from the controller hardware component 222 and can generate a sequence of operations based on the context data. In some embodiments, the sequence of operations can be further based on a type or configuration of the memory component 210. The type or configuration of the memory component 210 can identify the resources of the memory component 210 that are available, such as the number of buffers that can be used to store data associated with program operations or read operations, or any other resource or characteristic of the memory component 210. For example, the controller firmware component 221 can generate the sequence of operations to determine steps or operations for the controller hardware component 222 to perform in order to perform the read operation and to resume the performance of the interrupted program operations. In some embodiments, the sequence of operations can specify particular data of particular program operations that are to be copied to different buffers or other such memory locations, when to perform the operations in the sequence, etc. Thus, the sequence of operations can specify any combination of operations that can specify how the controller hardware component 222 is to interact with the memory component 210 to perform the read operation and to resume the interrupted program operations.

In some embodiments, the controller hardware component 222 can be considered to operate in a control mode when the program operations are interrupted. The control mode can specify that the controller hardware component 222 can be controlled by the sequence of operations from the controller firmware component 221. Once the sequence of operations have been performed by the controller hardware component 222, the controller hardware component 222 can return from the control mode to operate in a self-controlled mode where the controller hardware component 222 can operate without a further sequence of operations from the controller firmware component 221.

In the same or alternative embodiments, the controller hardware component 222 can receive the sequence of operations or operate in a control mode with respect to a particular memory component out of multiple memory components of the memory sub-system. For example, a read operation can be received for a particular memory component and program operations for the particular memory component can be interrupted while other program operations for other memory components can still be performed without being interrupted. Furthermore, the controller hardware component 222 can operate in the control mode with respect to the particular memory component while operating under normal conditions without input from the controller firmware component 221 for other memory components.

Figure 3:
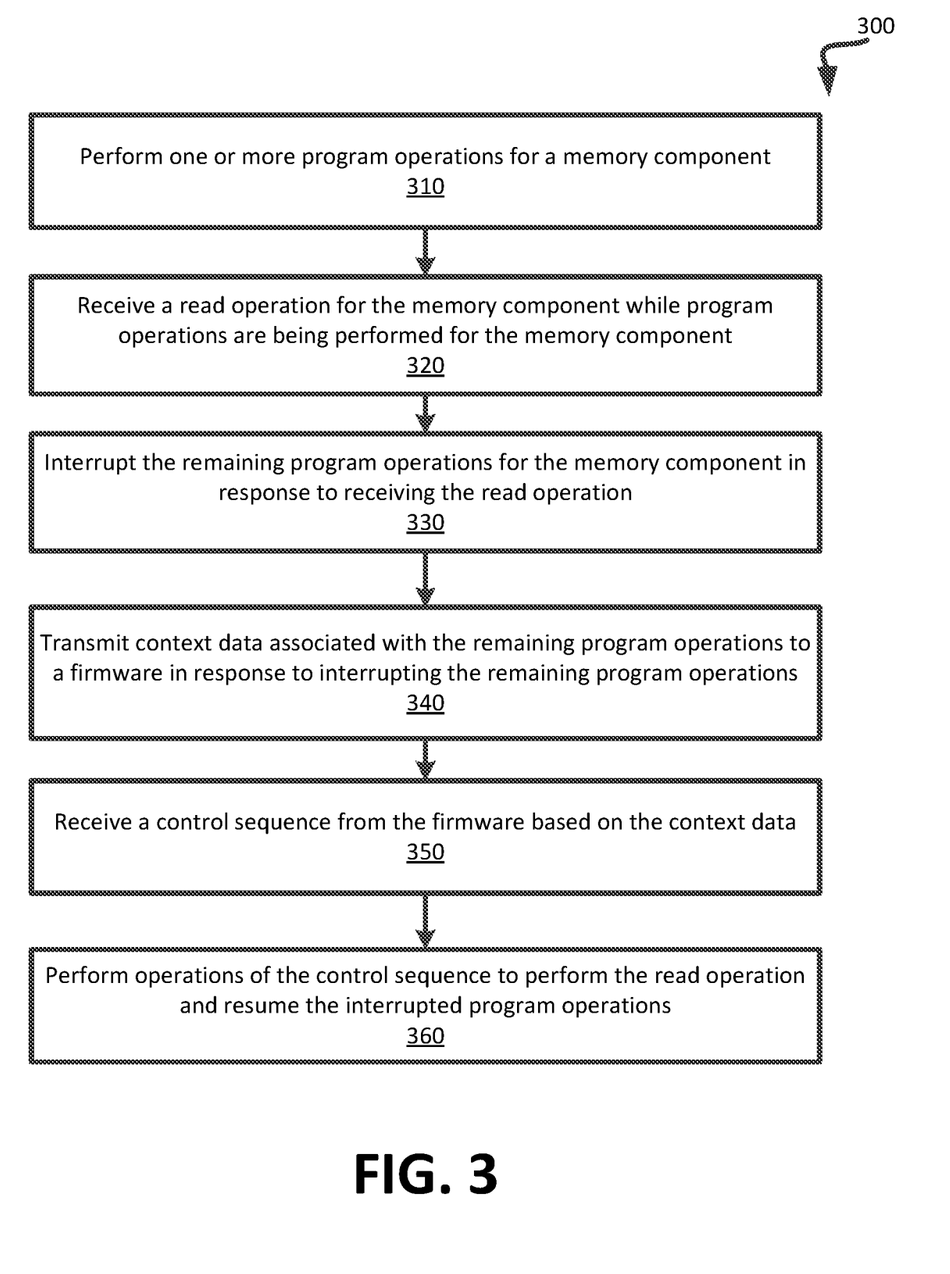
FIG. 3 is a flow diagram of an example method to interrupt program operations to perform a read operation in accordance with some embodiments.

FIG. 3 is a flow diagram of an example method 300 to interrupt program operations to perform a read operation in accordance with some embodiments. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the operation interruption component 113 of FIG. 1. Although shown in a particular sequence or order, unless otherwise specified, the order of the processes can be modified. The illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 3, at operation 310, the processing logic performs one or more program operations for a memory component. For example, the hardware component (i.e., a hardware portion or circuitry) of a controller can receive program operations and corresponding data from a host system and/or the firmware component of the controller. One or more of the received program operations can currently be performed as the hardware component transmits corresponding data to the memory component. For example, one or more buffers of the memory component can be used to store the data from a performed program operation. Other program operations received by the hardware component may not yet be performed at the memory component. At operation 320, the processing logic receives a read operation for the memory component while one or more program operations are being performed for the memory component. For example, the read operation can be received from the host system and/or the firmware component of the controller. Thus, the read operation can be received by the hardware component of the controller while the hardware component is performing one or more program operations that were previously received.

As shown, at operation 330, the processing logic interrupts the remaining program operations for the memory component in response to receiving the read operation. For example, any program operation being performed by the hardware component at the same memory component can be paused or interrupted. Other program operations being performed for other memory components may not be paused or interrupted. In some embodiments, the pausing or interruption of a program operation can include the halting of the transmission of data of the program operation from the hardware component of the controller to the memory component (e.g., a buffer of the memory component). The program operation can be performed via a sequence of sub-operations or commands. For example, the program operation can be performed by the sequence of sub-operations or commands being performed with certain timing conditions between the sub-operations or commands. The interrupting of the programming operation can thus result in the interruption of multiple sub-operations or commands that are being performed to complete the program operation. In some embodiments, such sub-operations or commands can be an interruption of data being transferred to the memory cells of a memory component, an interruption of a programming sub-operation or command, an interruption of an erase sub-operation or command, data recall sub-operation or command to transmit data from a buffer of the memory component to the hardware component of the controller, etc. At operation 340, the processing logic transmits context data associated with the remaining program operations to a firmware in response to interrupting the remaining program operations.

In some embodiments, the context data can be transmitted to the firmware (i.e., the firmware component of a controller) when the hardware component is not capable of determining a sequence of operations to perform the read operation and to resume the interrupted program operations. For example, the state or progress of the interrupted or paused program operations can be at a point in the program operation where the hardware component cannot determine operations or an ordering of operations that can be performed to safely resume the interrupted or paused program operation so that the data that was being written to the memory cells of the memory component can be valid when the program operation is resumed. For example, the additional operations specified by the control sequence can be used to retain the data of the program operations that were interrupted so that the retained data can be used when resuming the interrupted program operations. In some embodiments, the retained data can be stored at one or more of the buffers of the memory component. The retained data can then be returned to the buffer that had previously stored the data of the program operations that had been interrupted. In the same or alternative embodiments, the data can be returned from a buffer of the memory component to the hardware component of the controller and the data can then be retained or stored at a hardware component memory buffer. Subsequently, when the program operation is to resume, the retained data for the program operation can be returned to a buffer of the memory component or the buffer of the memory component that had previously stored the data of the program operation.

The context data can specify information relating to the one or more program operations, the remaining program operations that were interrupted, a state of the memory component, etc. For example, the context data can specify any or all of which program operations have been interrupted while being performed and at which point in the program operation the corresponding program operation has been interrupted, which program operations have already been performed by the hardware component to the memory component, state information of the memory component at which the program operations have been interrupted, etc. Thus, the context data can identify the status of the program operations and the state of the memory component.

As shown in FIG. 3, at operation 350, the processing logic receives a control sequence from the firmware based on the context data. The control sequence can be a sequence of additional operations that have been generated by the firmware and that are to be performed by the hardware component of the controller after program operations have been interrupted. The sequence of operations can specify a series of operations that are to be performed by the hardware component with the memory component in order to resume the performance of the interrupted program operations. In some embodiments, the sequence of operations can specify a series of operations to perform the read operation and to resume the interrupted program operations. For example, the sequence of operations can specify where data for a particular interrupted program operation at a buffer of the memory component is to be copied to when the read operation is to be performed. For example, the performance of the read operation can result in data from the memory cells of the memory component being stored at a first buffer of the memory component that currently stores data of the interrupted program operation. The sequence of operations can specify another location to copy the data of the interrupted program operation. For example, another buffer of the memory component (or other such location of the memory component) can be used to copy the data of the interrupted program operation. Subsequently, the first buffer can be used to retrieve the data of the read operation and return the data to the hardware component of the controller. The sequence of operations can further specify that the data of the interrupted program operation is then to be copied from the other location (e.g., the other buffer) to the first buffer that previously stored the data of the program operation. Any other combination of operations with respect to the hardware component of the controller and the memory component can be specified by the sequence of operations so that the data of interrupted program operations can be valid.

In some embodiments, the sequence of operations can further be based on the type or configuration of the memory component. For example, the firmware can store or retrieve a data structure that specifies the type or configuration of the memory component. The type or configuration of the memory component can specify information of the architecture or design of the memory component. In some embodiments, the type or configuration if the memory component can be used to determine the resources (e.g., the amount of buffers) of the memory component that can be used for the read operation and program operations. In some embodiments, the sequence of operations can be based on an identification of a priority of the read operation. For example, if the read operation is a high priority read operation (e.g., from an application of the host system), then the sequence of operations can further confirm the interruption of the program operations and can indicate that the read operation is to be performed. Otherwise, if the read operation is a low priority read, then the sequence of operations can indicate that the program operations are to complete or can specify that a portion of the program operations are to complete while another portion are to be interrupted in order to perform the read operation.

At operation 360, the processing logic performs operations of the control sequence to perform the read operation and to resume the interrupted program operations. For example, the hardware component of the controller can perform the series of operations specified by the firmware in order to perform the read operation and to safely resume the performance of the interrupted program operations after completion of the read operation. Furthermore, any program operations that had been received by the hardware component of the controller but had not yet been performed can also resume after the interrupted program operations have completed.

Figure 4:
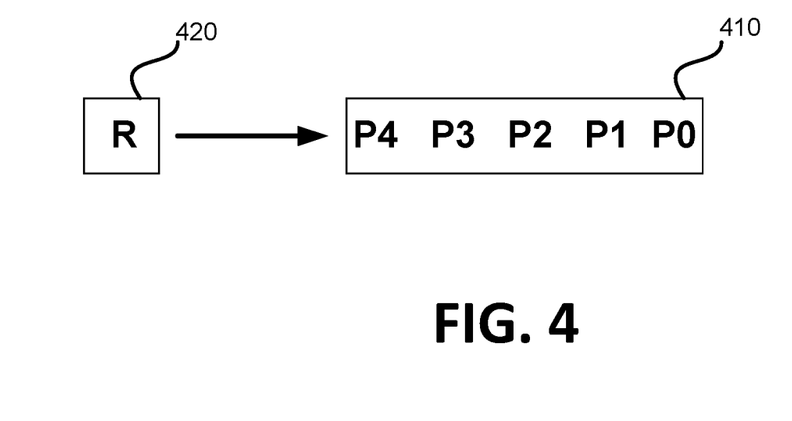
FIG. 4 illustrates the receiving of program operations and subsequent receiving of a read operation in accordance with some embodiments of the present disclosure.

FIG. 4 illustrates the receiving of program operations and subsequent receiving of a read operation in accordance with some embodiments of the present disclosure. The receiving of the program operations and read operation can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the receiving of the program operations and the read operation are performed by the operation interruption component 113 of FIG. 1.

As shown in FIG. 4, a series of program operations 410 can be received by the hardware component of a controller of a memory sub-system. The hardware component can perform one or more of the program operations while other program operations are in queue to be performed by the hardware component. For example, the hardware component can currently be performing the first program operation P0 and the second program operation P1. The program operations P2, P3, and P4 can be queued but corresponding data of the program operations P2, P3, and P4 is not being transmitted to a buffer of a memory component of the memory sub-system. While the first and second program operations are being performed, the read operation 420 can be received by the hardware component of the controller. The first and second program operations can then be interrupted or paused so that the read operation 420 can be performed. Context data of the program operations can then be provided to the firmware of the controller. For example, an identification that the first and second program operations that have been interrupted can be provided. The identification can specify a particular step or state of the program operation at which the program operation was interrupted. For example, the context data can identify an amount of the data of the program operation that has been written to the memory cells and/or an amount of the data that has not yet been written to the memory cells of the memory component before the program operation was interrupted. The context data can further indicate that the performance of the program operations P2, P3, and P4 has not yet begun. After the first and second program operations P0 and P1 have been interrupted, the read operation 420 can be performed.

Figure 5:
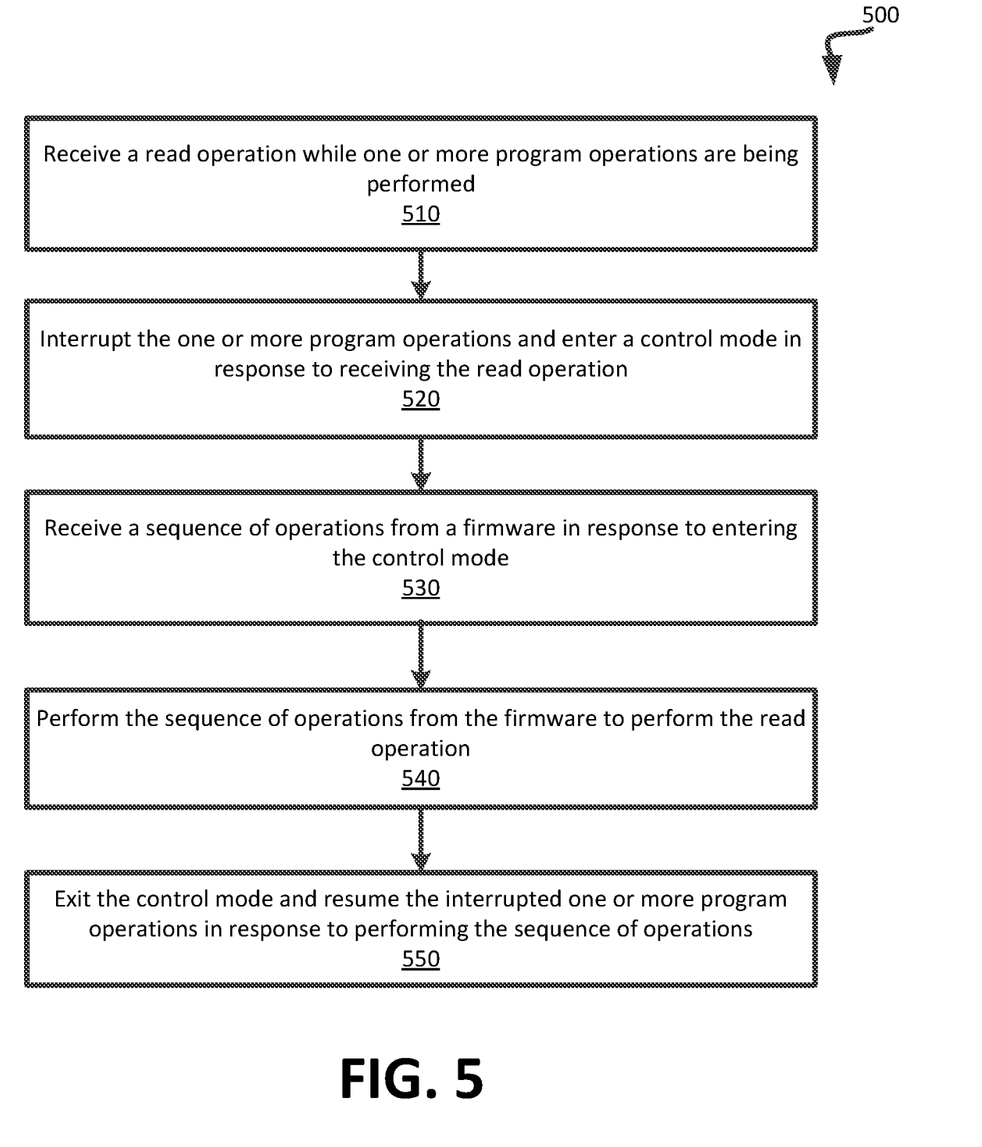
FIG. 5 is a flow diagram of an example method to operate in a control mode when receiving a read operation while one or more program operations are being performed in accordance with some embodiments of the present disclosure.

FIG. 5 is a flow diagram of an example method 500 to operate in a control mode when receiving a read operation while one or more program operations are being performed in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the operation interruption component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 5, at operation 510, the processing logic receives a read operation while one or more program operations are being performed. For example, a read operation can be received from a host system. The read operation can specify that data is to be retrieved from a memory component that is subjected to the one or more program operations. At operation 520, the processing logic interrupts the one or more program operations and enters a control mode in response to receiving the read operation. For example, the program operations that are currently being performed at the memory component can be interrupted. The control mode can be a state of the hardware component of the controller where a sequence of operations (e.g., the control sequence) from the firmware is to be used to determine the behavior or operation of the hardware component. The hardware component of the controller can be in a normal mode before the program operations are interrupted. The normal mode can refer to an operating state where the hardware component of the controller can perform operations without the control sequence from the firmware.

At operation 530, the processing logic receives a sequence of operations from a firmware in response to entering the control mode. For example, the firmware can be the firmware of the controller that includes the hardware component. In some embodiments, the sequence of operations can be a series of operations or steps that are to be performed by the hardware component of the controller when in the control mode. Thus, the hardware component can enter the control mode when a read operation is received and one or more program operations have been interrupted. As previously described, the sequence of operations or the control sequence can be based on the context data of interrupted program operations. Thus, the sequence of operations or the control sequence can be based on one or more interrupted program operations. At operation 540, the processing logic performs the sequence of operations from the firmware to perform the read operation. For example, as previously described, the sequence of operations can specify that data at a buffer of the memory component is to be copied to another location or buffer so that data of the read operation can be stored at the buffer. Thus, the hardware component of the controller can operate based on the instructions from the firmware when the hardware component is operating in the control mode.

Furthermore, at operation 550, the processing logic exits the control mode and resumes the interrupted one or more program operations in response to performing the sequence of operations. In some embodiments, the sequence of operations can specify a last command for the hardware component to exit the control mode. After the read operation has been performed, data of the interrupted program operations can be copied and/or modified so that the program operations can resume and complete at the memory component.

Figure 6:
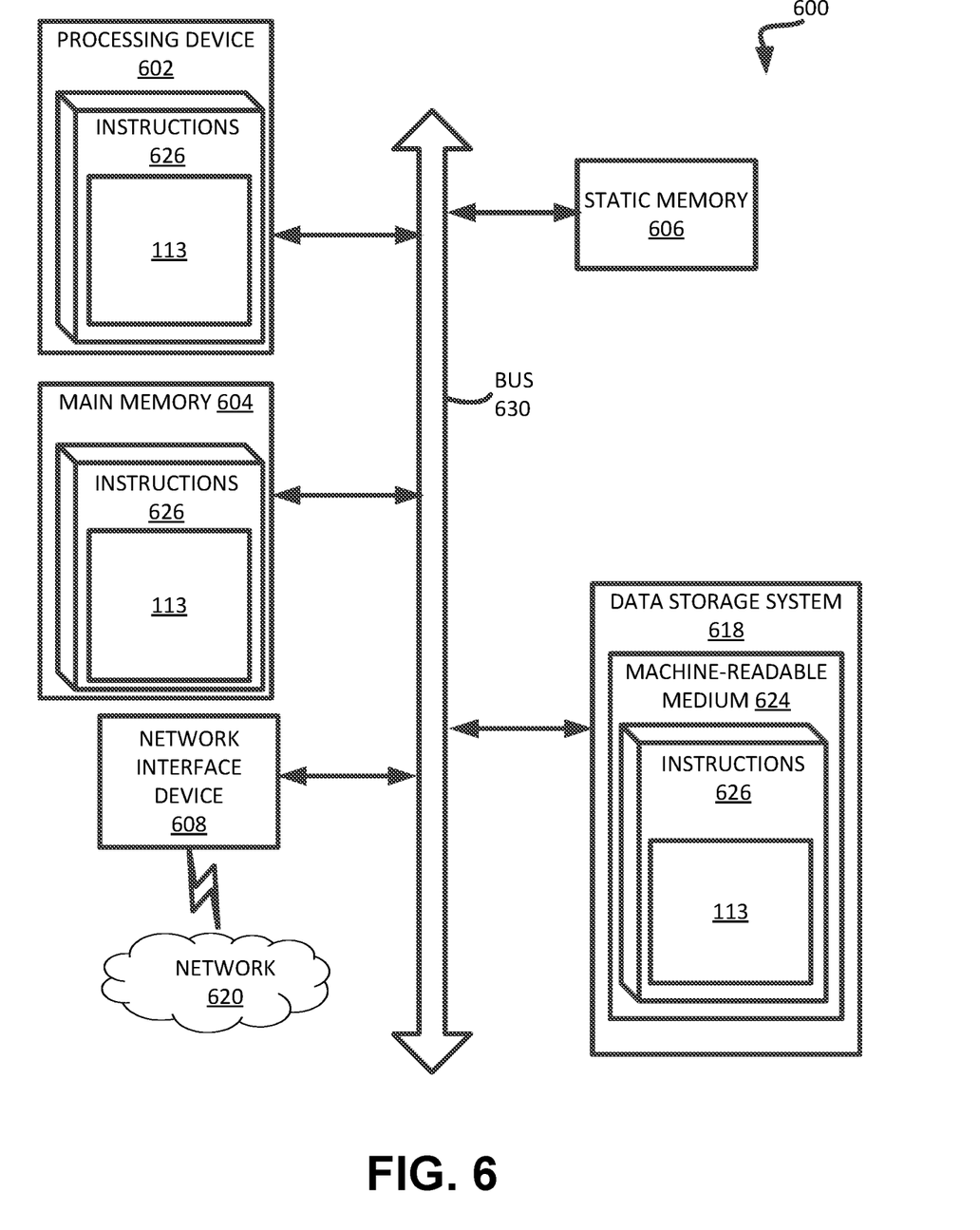
FIG. 6 is a block diagram of an example computer system in which implementations of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to an operation interruption component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (i), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to an operation interruption component (e.g., the operation interruption component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    receiving a read operation while one or more program operations are being performed at a memory sub-system;
    in response to receiving the read operation, interrupting the one or more program operations being performed at the memory sub-system;
    determining context data associated with the one or more interrupted program operations;
    providing the context data to a firmware associated with the memory sub-system;
    receiving a control sequence from the firmware based on the context data,
    wherein the control sequence specifies one or more additional operations that are associated with copying data of the one or more interrupted program operations between first and second memory locations of a memory component; and
    performing, by a processing device, the read operation and resuming the one or more interrupted program operations based on the one or more additional operations specified by the control sequence from the firmware.

2. The method of claim 1, wherein the context data identifies a point of the one or more program operations when the one or more program operations have been interrupted.

3. The method of claim 1, wherein the context data is based on a state of the memory component, and the memory component is associated with the one or more program operations when the one or more program operations have been interrupted.

4. The method of claim 1, wherein performing the read operation and resuming the one or more interrupted program operations based on the one or more additional operations specified by the control sequence from the firmware comprises:
    performing the one or more additional operations specified by the control sequence from the firmware, wherein the one or more additional operations are associated with copying data from a buffer of the memory component of the memory sub-system to another buffer of the memory component.

5. The method of claim 1, wherein the one or more additional operations correspond to retaining data associated with the one or more interrupted program operations, the retained data being used to resume the one or more interrupted program operations.

6. The method of claim 1, wherein the control sequence is further based on a type of the memory component of the memory sub-system that is associated with the one or more program operations.

7. The method of claim 1, wherein the firmware corresponds to firmware of a controller of the memory sub-system, and wherein the interrupting of the one or more program operations is based on a hardware component of the controller.

8. A system comprising:
a memory component; and
a processing device, operatively coupled with the memory component, to:
   receive a read operation while a program operation is being performed at the memory component;
   in response to receiving the read operation while the program operation is being performed at the memory component, interrupt the program operation;
   receive a sequence of operations from a firmware component of a controller associated with the memory component, the sequence of operations specifying one or more additional operations that are associated with copying data of the interrupted program operation between first and second memory locations of the memory component;
   perform the sequence of operations including the read operation and the one or more additional operations; and
   resume the interrupted program operation in response to performing the sequence of operations.

9. The system of claim 8, wherein the sequence of operations is further based on an identification of a point of the program operation when the program operation has been interrupted.

10. The system of claim 8,
wherein the one or more additional operations are associated with copying data from a buffer of the memory component to another buffer of the memory component, wherein the copied data is associated with the interrupted program operation.

11. The system of claim 8, wherein the one or more additional operations correspond to retaining the data associated with the interrupted program operation, the retained data being used to resume the interrupted program operation.

12. The system of claim 8, wherein the sequence of operations is further based on a configuration of the memory component.

13. A system comprising:
a memory component; and
a processing device, operatively coupled with the memory component, to:
   receive a read operation while one or more program operations are being performed at a memory sub-system;
   in response to receiving the read operation, interrupt the one or more program operations being performed at the memory sub-system;
      determine context data associated with the one or more interrupted program operations;
      provide the context data to a firmware associated with the memory sub-system;
      receive a control sequence from the firmware based on the context data, wherein the control sequence specifies one or more additional operations that are associated with copying data of the one or more interrupted program operations between first and second memory locations of the memory component; and
      perform the read operation and resume the one or more interrupted program operations based on the one or more additional operations specified by the control sequence from the firmware.

14. The system of claim 13, wherein the context data identifies a point of the one or more program operations when the one or more program operations have been interrupted.

15. The system of claim 13, wherein the context data is based on a state of a memory component associated with the one or more program operations when the one or more program operations have been interrupted.

16. The system of claim 13, wherein to perform the read operation and resume the one or more interrupted program operations based on the one or more additional operations specified by the control sequence from the firmware, the processing device is further to:
   perform the one or more additional operations specified by the control sequence from the firmware, wherein the one or more additional operations are associated with copying data from a buffer of a memory component of the memory sub-system to another buffer of the memory component.

17. The system of claim 13, wherein the one or more additional operations correspond to retaining data associated with the one or more interrupted program operations, the retained data being used to resume the one or more interrupted program operations.

18. The system of claim 13, wherein the control sequence is further based on a type of a memory component of the memory sub-system that is associated with the one or more program operations.

19. The system of claim 13, wherein the firmware corresponds to firmware of a controller of the memory sub-system, and wherein the interrupting of the one or more program operations is based on a hardware component of the controller.

* * * * *